Nov. 28, 1961 W. B. LYNCH 3,010,694
CONDUIT PLUG AND COUPLING ASSEMBLY
Filed March 20, 1959 2 Sheets-Sheet 2
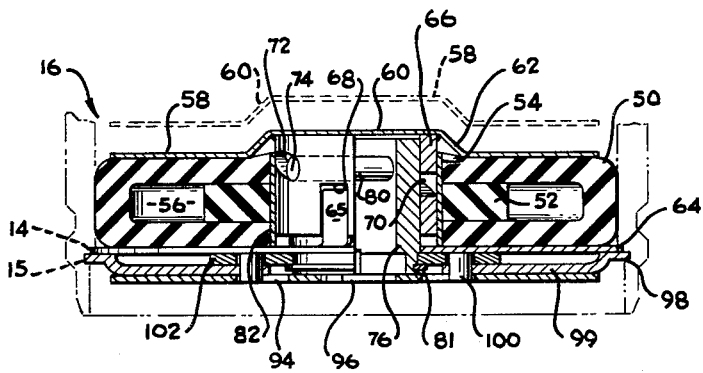
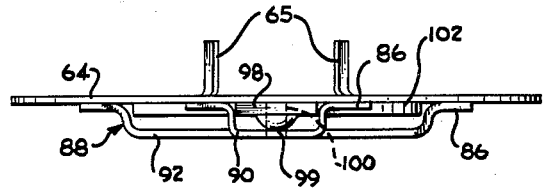
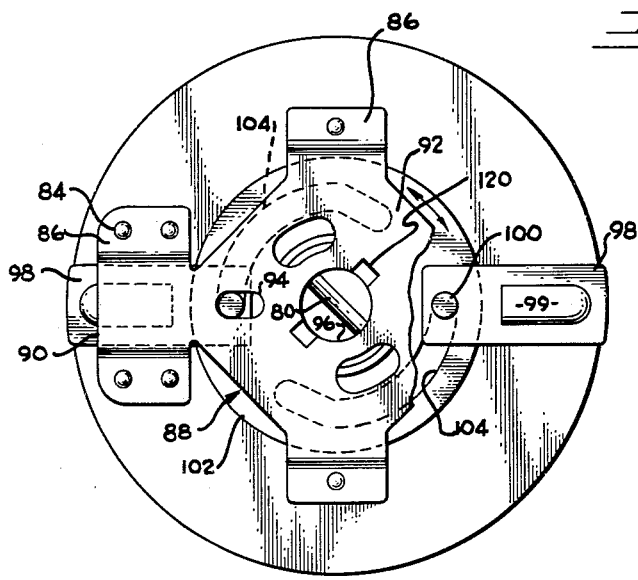
INVENTOR.
WILLIAM B. LYNCH
BY
Mason & Graham
ATTORNEYS

# United States Patent Office 3,010,694
Patented Nov. 28, 1961

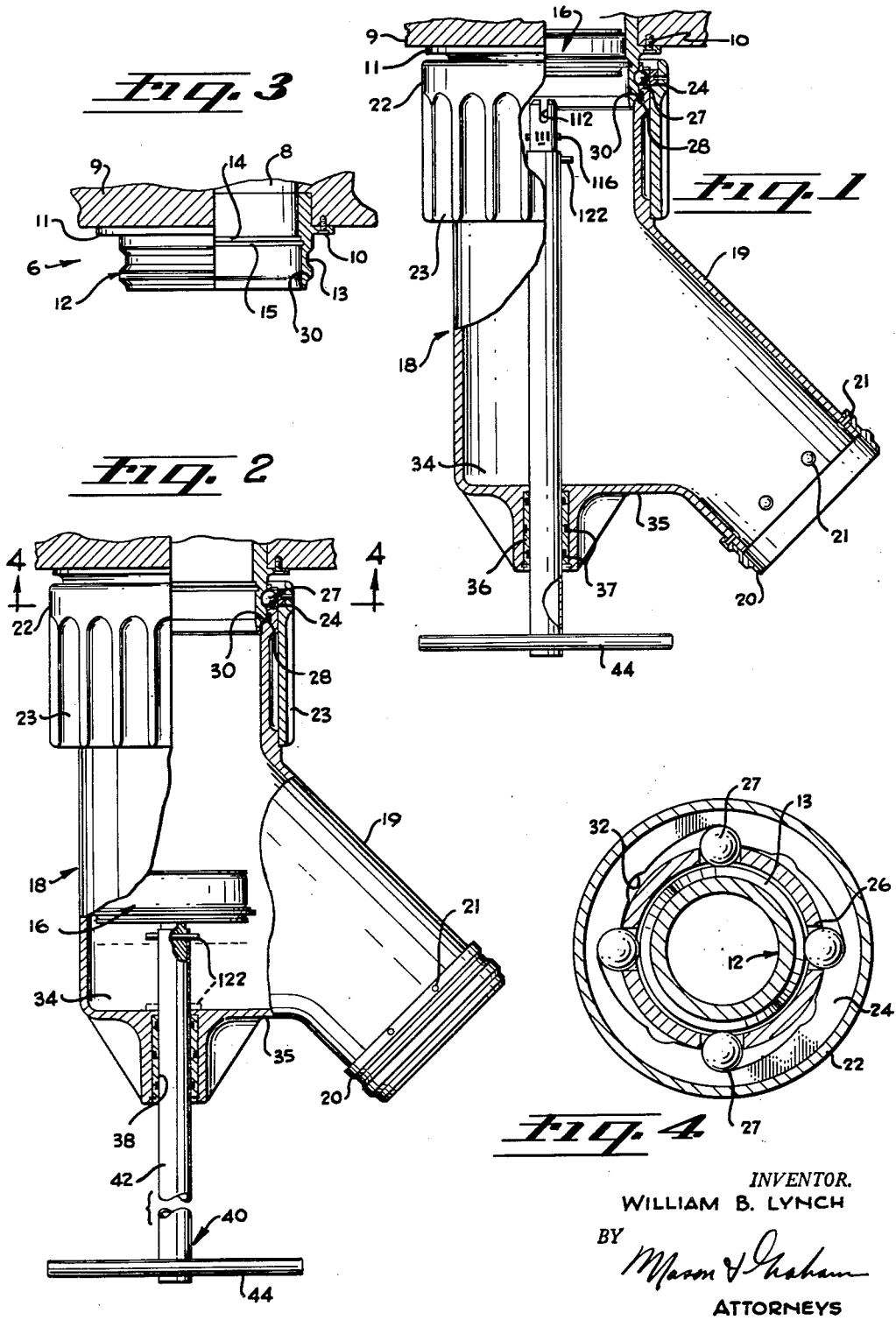

3,010,694
CONDUIT PLUG AND COUPLING ASSEMBLY
William B. Lynch, Saugus, Calif., assignor to Airaterra, Glendale, Calif., a corporation of California
Filed Mar. 20, 1959, Ser. No. 800,692
8 Claims. (Cl. 251—189)

This invention relates to a novel valve construction of the type axially insertable into a cylindrical conduit to plug the same, and alternately retractable from such seated position to permit fluid flow through a lateral outlet anterior to the position of the retracted plug.

It also pertains to a coupling assembly adapted for temporary connection to a tank or conduit outlet within which such valve is normally seated, which assembly carries means for withdrawing said valve into the assembly and also providing a bypass for flushing out the tank and then reseating the valve in its outlet, followed by removal of the coupling assembly.

Similarly it relates to means and method for intermittently draining and/or flushing an accumulation-type reservoir or tank. Such a tank is exemplified by that in an aircraft, which is connected to the lavatory and/or toilet outlets and which obviously cannot be discharged in flight as it accumulates. Accordingly when the aircraft lands, the tank must be flushed out or at least drained. By the present coupling assembly and valve construction, this can be effectuated both quickly and efficiently.

It will be apparent however that employment of my valve construction is not limited to use with a detachable coupling assembly but may be permanently mounted in any fluid line which is provided with a more-or-less lateral connection exposable by axial retraction of the valve.

Another object of the invention is the provision of a coupling assembly carrying unique key means for releasing the present valve. In other words, my valve, seated in the outlet conduit of the accumulation tank, can be unlocked only after connection of the coupling assembly which thus provides a fool-proof arrangement against accidental discharge thereof.

Still another purpose is to provide an annular plug-type valve having peripheral expanding seating means actuated by axial movement of opposing faces of the annulus, externally effectuated from without the conduit in which the valve is seated.

Yet another object is the provision of such a valve with radially-acting seating lugs, mechanically actuated simultaneous with peripheral expansion of the sealing annulus.

A further purpose is to provide an essentially doughnut-shaped elastomeric valve plug with manually operable contraction and expansion means for seating and unseating same in a fluid conduit as well as to provide locking means for lodging the same against accidental discharge.

Still another feature comprises means for preventing withdrawal of the valve-operating tool from the coupling assembly except when the valve is locked in seated position.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings which form part of the present specification:

FIG. 1 is a side elevational view, partly in section, of the flush assembly coupled to an accumulation tank outlet and showing my valve seated in locked position in the outlet;

FIG. 2 is a similar view showing the valve dropped to an open position within the assembly so as to permit the tank to be drained or flushed;

FIG. 3 is a similar view of the tank outlet connection nipple alone without the flush assembly coupled thereto;

FIG. 4 is a transverse sectional view taken along the line 4—4 of FIG. 2, particularly showing the relation of the detent balls to the seating grooves of the cam ring, somewhat diagrammatically and seen in "open" or uncoupled position;

FIG. 5 is a vertical sectional view taken through the valve unit along the diameter thereof when in compressed or locked position, with corresponding open or unlocked position indicated in broken lines, and the position of the adjacent outlet conduit walls also shown in phantom lines;

FIG. 6 is a bottom plan view of the valve unit;

FIG. 7 is a side elevational view of the bottom plate and associated structures detached from the lower face of the valve; and FIG. 8 is a side elevational view of the key end of the operating handle shown coupled to the release pin, with some adjacent parts of the inner actuator sleeve and outer cam sleeve shown in section.

My flush assembly is here shown in an embodiment particularly adapted for quick coupling to a cylindrical outlet or nipple unit 6 (FIG. 3), conventionally secured to a drain outlet 8 of a lavatory tank or conduit 9 as by bolts or screws 10 inserted upward through an annular attachment flange 11 of the nipple unit, the latter being formed with a tubular downwardly projecting section 12 externally provided with a peripheral, detent-receiving groove 13 and internally being formed with an adjacent pair of seating grooves 14, 15 of slightly different radius and adapted to have the valve assembly 16, (FIG. 5) lodged adjacent thereto when the latter is seated to close the outlet.

Essentially the coupling assembly consists of an upright tubular portion 18 having an angularly downwardly projecting side arm 19 in communication therewith and providing a continuous channel for removal of the material being flushed through. A coupling nipple 20 (which may be similar to the unit 6) is shown secured adjacent its mouth by rivets 21 for attachment to a hose or other fluid line (not shown) as desired. At its upper extremity there is provided an outer rotatable locking collar 22 formed with external flutings 23 for manual engagement and having an annular inwardly projecting cam ring 24 fixedly secured to the inner face thereof. The inner, annular mouth 25 of the coupling is formed with a peripheral series of circular apertures 26 through which detent balls 27 may project when pressed by the rotatable cam ring 24 into the nipple groove 13, which pressure of the detents into the groove serves also to draw the assembly axially upward on the nipple 12, to compress the gasket ring 28 against an annular shoulder 30 of the nipple. The face of the cam ring adjacent the detents is provided with successive lock pockets 32 (i.e. one for each detent) which thus guard against spontaneous uncoupling by requiring a positive pressure by the operator to unseat, by counter-rotation of the ring.

Thus, upon rotating the cam collar clockwise, when viewed from the coupling or cap end of the connection, the action of the cam pushes the balls inward into the groove 13 forcing the two halves of the assembly together. As the balls reach the end of the cam travel, they drop into the lock pockets 32, and a positive "snap" can be heard and felt which indicates that the coupling is in a locked position. Thus forcing of the two halves of the coupling assembly together likewise compresses the O-ring 28 between the coupling and the nipple, providing a positive seal and the separating spring force necessary to the operation of the lock. Such a cam detent-ball coupling construction is shown in U.S. Patent 2,470,256 of McIlroy, May 17, 1949.

The lower extremity 34 of the coupled conduit 18 is formed with a transverse closure wall 35 having a centrally located, cylindrical plug or packing gland 36 located therein and provided with successive O-rings 37 disposed about a central, restricted channel 38 adapted to receive therethrough a valve-operating tool 40 which is formed with an elongated cylindrical shank 42 and a generally terminal cross bar handle 44 adjacent its free end. The detailed operation of the tool will be explained in connection with the explanation of the valve construction, but it may be observed that the opening 38 through which the tool extends, is in axial alignment with the valve unit 16 lodged in the coupled nipple 6 thereabove, and by engagement with the operating tool the valve is unlocked and dropped to the lower portion indicated by broken lines within the conduit 18 so as to permit fluid flow from the tank 9 outward through the coupled side arm 19.

The valve unit itself 16 is constructed essentially of a doughnut-shaped ring 50 in section appearing like a U on its side, and with an inner annular filler or sealing ring 52 disposed between the two arms of the U about a common axial channel 54 so as to leave an intermediate annular space 56 within the doughnut to accommodate compression and expansion of the whole. This composite deformable unit made of natural or synthetic elastomeric material, for example, the outer doughnut of silicon rubber and the insert of sponge rubber. A top cover plate 58 of fairly rigid material, such as steel, is formed with an upwardly projecting, central disk portion 60 generally corresponding at its periphery to the axial channel 54 and formed with outwardly tapered or sloping lateral walls 62. A lower cover plate 64 of similar rigid material and somewhat greater perimeter that that of the top plate is mounted adjacent the lower face of the doughnut ring 50 by means of an upwardly extending pair of axially directed slide arms 65.

Projecting downward from the central raised section of the top cover is an annular sleeve 66 fixedly secured thereto as by solder or formed integral therewith if desired, and adapted to be inserted into the central aperture of the doughnut. A pair of slots 68 diametrically positioned are cut upward from the lower edge of the sleeve to slidingly receive an upwardly projecting pair of arms 65 of the lower plate and thus lock it against rotation in relation to the upper plate while permitting limited axial movement in respect thereto. The sleeve is formed with a diametrically opposite pair of generally helical, closed-end camway 70 slanted clockwise upward to an extreme position 72 substantially flush with the lower face of the top plate, and thence directed somewhat downward to form a locking position 74 (FIG. 5). Rotatably mounted within the cam sleeve 66 is a tubular member or actuator sleeve 76, transversely apertured at 78 to receive therethrough a cylindrical cross-pin 80, the ends of which project into the cam slots 70. The pin is retained in position by an outer sleeve 82 inserted upward about the external face of the cam sleeve 66 adjacent the central aperture face of the composite doughnut ring. A snap ring 81 seated in an outer groove 83 of the actuator sleeve 76, serves to connect the bottom plate 64 thereto, the sleeve being thus rotatable within the plate. An opposing pair of diametrically opposite, downwardly opening engagement slots 85 in member 76 which are circumferentially offset with relation to the cross pin 80, completes the inner construction. It will be observed that rotation of the transverse pin 80 about its transverse axis from within the axial aperture of the sleeve 76 has the effect of extending and retracting the sleeve 66 axially relative to the sleeve 76—in other words it moves the external cover plate 58 toward and away from cover plate 64, thus compressing or expanding the juxtaposed, deformable doughnut ring sandwiched therebetween.

Rigidly secured to the lower face of the bottom cover 64 as by welding or rivets 84 through lateral, attachment feet 86, is a centrally located frame or cage 88, spaced axially downward from the bottom plate and consisting essentially of a diametrically aligned pair of slideways 90 radially projecting from a central, generally rectangular section 92 of the frame, which latter section is formed with a pair of radial cam slots 94 disposed on opposite sides of a central aperture 96 in joint longitudinal alignment with each other and with the slideways 90. Longitudinally movable within each of the slideways 90, there is located a radially directed locking ear 98 formed with a medial rib or boss 99 and having a downwardly projecting cam pin 100 secured adjacent its inner extremity and seated within the corresponding cam slot 94.

Within the raised central portion 92, juxtaposed in sliding registration with the lower face of the bottom plate 64 and axially anterior to the snap ring 81 is located an annular cam plate 102 provided with a pair of helical cam slots 104 and secured to the inner actuator sleeve 76 by lodgement in a lower peripheral groove 106 and insertion of a diametrically opposed pair of inwardly projecting lugs 107 into the corresponding slots 85 of the sleeve. The cam pins 100 of the locking ears are also seated within the cam slots 104 so that upon rotation of the inner sleeve 76 the simultaneous movement of the cam plate 102 will also extend or retract the locking ears 98 (so as to seat in the inner nipple groove 15) at the same time that the doughnut ring 50 is being expanded or retracted. Thus it will be seen that the axially expanded position of the two cover plates corresponds to the retracted position of the engaging ears 98, and conversely the compressed position of the cover plates upon opposite faces of the doughnut occurs simultaneously with the extension of the locking ears which in such case may seat in the groove 15 to securely hold the sealing unit within the conduit.

There is further provided the aforementioned tool 40 consisting of a central cylindrical shaft 42 having an extension 111 of somewhat lesser diameter provided with a slot 112 adapted to receive the transverse pin 80 therein when the shaft is inserted upward into the central aperture of the valve assembly 16. Extension 111 also has a diametrically projecting cross pin 116 below the end of the slot 112 and extending normal thereto, its ends extending beyond each side of the portion 111 only as far as the greater perimeter of the main shaft 42 so as to be insertable through the entrance channel 38 of the coupling assembly. A corresponding slot 120 cut inward on opposite sides of the frame aperture 96, permits the pin 116 to pass therethrough. Upon rotation of the tool 40 to unlocked or open position, it will be seen that the operating tool can no longer be withdrawn from the valve assembly since the pin 116 is out of alignment with the corresponding slot 120. If desired, an additional cross pin 122 (FIG. 2) can be inserted through the shaft 42, adjacent the portion 111 so as permanently to retain the operating handle in the coupling tube 18 and limit downward movement of the tool.

Although I have illustrated and described a preferred form of my invention, I contemplate that various changes and modifications can be made therein without departing from the invention, the scope of which is indicated by the following claims.

I claim:

1. The combination comprising: a conduit attachment nipple formed with an inner peripheral valve-seat, a detachable conduit assembly having means for coupling same to said nipple, said assembly having a tubular section axially alignable with said nipple and being formed with a lateral outlet, a conduit plug consisting of a pair of annular cover plates formed of substantially rigid material, a ring of radially deformable material disposed between said plates in lateral registration therewith, and means carried by the plug for axially compressing and releasing said deformable ring by movement of the cover plates toward and away from each other comprising a tubular cam-sleeve axially located within said deformable ring between said plates and attached to one of the plates, said cam-sleeve being formed with a diametrically corresponding pair of helical keyways, an inner, actuating-sleeve rotatably disposed within said cam-sleeve and having a diametrically directed bore formed thereacross alignable jointly with said helical keyways, said actuating-sleeve being connected to the other of said plates, and a transverse pin inserted jointly through said bore and keyways and rotatably engageable by said externally operable means, said plug being adapted to be seated adjacent the valve seat of said nipple and to be selectively withdrawn therefrom into said tubular portion, and externally operable means insertable into said tubular portion for seating and unseating said plug in the nipple and for axially moving the same within the tubular section beyond said lateral outlet.

2. The combination of claim 1 wherein the conduit plug additionally includes peripherally located, extensible conduit-engaging lugs and means for extending and retracting said lugs simultaneous with compression and release of said deformable ring.

3. The combination of claim 2 wherein said tubular section is formed with a terminal closure wall having an aperture in general axial alignment with said plug, and said externally operable means comprises a rotatable shaft slidably inserted in said aperture and formed with an axial slot along its inserted end adapted to receive said transverse pin therein and rotate same.

4. An axially insertable and removable conduit plug of the character described, comprising a pair of annular cover plates formed of substantially rigid material one of which is axially apertured, a ring of radially deformable material disposed between said plates in lateral registration therewith, which plates and ring have a circumference substantially identical to each other and approximating the internal perimeter of a conduit into which they are adapted to be slidingly received, a tubular cam-sleeve axially located within said deformable ring between said plates and attached to one of the plates, said sleeve being formed with a diametrically corresponding pair of helical keyways, an inner, actuating-sleeve rotatably disposed within said cam-sleeve and having a diametrically directed bore formed thereacross alignable jointly with said helical keyways, said actuating-sleeve being connected to the other of said plates, and a transverse pin inserted jointly through said bore and keyways and medially externally engageable through the opening of said apertured plate for joint rotation with said inner sleeve whereby to cause relative axial movement of said plates to axially compress and radially expand said deformable ring.

5. The conduit plug of claim 4 which additionally includes a centrally apertured disk, rotatably disposed in juxtaposition to the free face of said apertured plate, said inner actuating sleeve being connected to said disk whereby rotary movement of said inner actuating sleeve is transmitted to the apertured plate by said disk.

6. The conduit plug of claim 5 which additionally includes peripherally located, extensible conduit-engaging lugs, and means responsive to joint rotation of said connected disk and inner sleeve for extending and retracting said lugs simultaneously with compression and expansion of the deformable seating ring.

7. The conduit plug of claim 6 wherein said last means including walls defining helical camways formed in said disk, and cam pins seated in said camways and operatively connected to said engaging lugs.

8. The conduit plug of claim 7 wherein said cam sleeve is formed with each helical keyway slanted contra-axially beyond the position corresponding to maximum axial compression of the deformable ring, thereby providing a locking position for the transverse pin when seated therein.

References Cited in the file of this patent

UNITED STATES PATENTS

| 287,189 | Stone | Oct. 23, 1883 |
| 1,059,053 | Lennon | Apr. 15, 1913 |
| 2,740,548 | Schultz | Apr. 3, 1956 |
| 2,756,897 | Houghton | July 31, 1956 |
| 2,764,184 | Fitzhugh | Sept. 25, 1956 |

FOREIGN PATENTS

| 835,379 | France | Sept. 19, 1938 |
| 130,217 | Australia | Nov. 23, 1948 |